United States Patent
Fu et al.

(10) Patent No.: US 10,305,688 B2
(45) Date of Patent: May 28, 2019

(54) METHOD, APPARATUS, AND SYSTEM FOR CLOUD-BASED ENCRYPTION MACHINE KEY INJECTION

(71) Applicant: ALIBABA GROUP HOLDING LIMITED, George Town, Grand Cayman (KY)

(72) Inventors: Yingfang Fu, Beijing (CN); Shuanlin Liu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 76 days.

(21) Appl. No.: 15/134,105

(22) Filed: Apr. 20, 2016

(65) Prior Publication Data

US 2016/0315768 A1   Oct. 27, 2016

(30) Foreign Application Priority Data

Apr. 22, 2015   (CN) .......................... 2015 1 0195062

(51) Int. Cl.
*H04L 29/06* (2006.01)
*H04L 9/08* (2006.01)
(Continued)

(52) U.S. Cl.
CPC .......... *H04L 9/0852* (2013.01); *G06F 21/602* (2013.01); *G06F 21/6218* (2013.01);
(Continued)

(58) Field of Classification Search
CPC ... H04L 9/0852; H04L 63/06; H04L 63/0428; H04L 63/061; H04L 63/0853; G06F 21/6218; G06F 21/602
See application file for complete search history.

(56) References Cited

U.S. PATENT DOCUMENTS

| 5,515,438 A | * | 5/1996 | Bennett | H04L 9/0858 |
| | | | | 380/256 |
| 6,931,128 B2 | * | 8/2005 | Roberts | H04L 9/0869 |
| | | | | 380/277 |

(Continued)

FOREIGN PATENT DOCUMENTS

EP   1 848 142 A2   10/2007

OTHER PUBLICATIONS

PCT International Search Report and Written Opinion dated Dec. 28, 2016, issued in corresponding International Application No. PCT/US16/28280 (9 pages).

(Continued)

*Primary Examiner* — David Garcia Cervetti
(74) *Attorney, Agent, or Firm* — Finnegan, Henderson, Farabow, Garrett & Dunner, LLP

(57) ABSTRACT

A cloud-based encryption machine key injection system includes at least one key injection sub-system including a key generation device and a quantum key distribution device connected with the key generation device, and a cloud-based encryption machine hosting sub-system including an encryption machine carrying a virtual encryption device and a quantum key distribution device connected with the encryption machine. The key injection sub-system and the encryption machine hosting sub-system are connected with each other through their respective quantum key distribution devices. The key generation device may generate a root key component of the virtual encryption device and transmit the root key component to the encryption machine. The encryption machine may receive root key components from one or more key generation devices and synthesize a root key of the virtual encryption device in accordance with the received root key components.

33 Claims, 6 Drawing Sheets

(51) Int. Cl.
*G06F 21/60* (2013.01)
*G06F 21/62* (2013.01)

(52) U.S. Cl.
CPC ......... *H04L 63/0428* (2013.01); *H04L 63/06* (2013.01); *H04L 63/061* (2013.01); *H04L 63/0853* (2013.01); *H04L 9/085* (2013.01)

(56) References Cited

U.S. PATENT DOCUMENTS

| | | | | |
|---|---|---|---|---|
| 7,068,790 | B1* | 6/2006 | Elliott | H04L 9/0852 380/256 |
| 7,245,722 | B2* | 7/2007 | Hirota | H04L 9/0858 380/256 |
| 7,430,295 | B1* | 9/2008 | Pearson | H04L 9/0858 380/256 |
| 7,519,814 | B2* | 4/2009 | Rochette | G06F 8/60 709/214 |
| 7,627,126 | B1* | 12/2009 | Pikalo | H04L 9/0858 356/473 |
| 7,697,693 | B1* | 4/2010 | Elliott | H04B 10/70 380/278 |
| 7,706,535 | B1* | 4/2010 | Pearson | H04L 9/0855 380/255 |
| 7,853,020 | B2* | 12/2010 | Beal | H04L 9/0858 380/283 |
| 7,889,868 | B2* | 2/2011 | Wellbrock | H04L 9/0858 380/263 |
| 8,082,443 | B2* | 12/2011 | Troxel | H04L 9/0852 380/256 |
| 8,213,607 | B2* | 7/2012 | Rose | H04L 9/0662 380/268 |
| 8,213,616 | B2* | 7/2012 | Bloch | H04K 1/02 380/268 |
| 8,694,989 | B1* | 4/2014 | Carlson | G06F 9/45537 717/174 |
| 8,862,741 | B1* | 10/2014 | Tegtmeier | H04L 41/145 709/220 |
| 8,897,449 | B1* | 11/2014 | Broadbent | H04L 9/0891 380/277 |
| 8,990,809 | B1* | 3/2015 | Jacob | G06F 9/45533 718/1 |
| 9,036,817 | B1* | 5/2015 | Hunt | H04L 9/0852 380/44 |
| 9,118,464 | B2* | 8/2015 | Nix | H04W 4/70 |
| 9,184,912 | B2* | 11/2015 | Harrington | H04L 9/0852 |
| 9,319,223 | B2* | 4/2016 | Nix | H04W 4/70 |
| 9,747,091 | B1* | 8/2017 | Berg | G06F 8/61 |
| 9,747,136 | B2* | 8/2017 | Sathyamurthy | G06F 9/5077 |
| 9,755,828 | B2* | 9/2017 | Tanizawa | H04L 9/0852 |
| 9,767,317 | B1* | 9/2017 | Chakrovorthy | G06F 21/71 |
| 2005/0036624 | A1* | 2/2005 | Kent | H04L 9/0858 380/277 |
| 2005/0190921 | A1* | 9/2005 | Schlafer | H04L 9/0858 380/278 |
| 2006/0062392 | A1* | 3/2006 | Lee | H04L 9/0852 380/278 |
| 2006/0088157 | A1* | 4/2006 | Fujii | H04L 9/0858 380/30 |
| 2006/0222180 | A1* | 10/2006 | Elliott | H04L 9/0852 380/263 |
| 2007/0014415 | A1* | 1/2007 | Harrison | H04L 9/0858 380/278 |
| 2007/0016534 | A1* | 1/2007 | Harrison | G06Q 20/367 705/65 |
| 2007/0076884 | A1* | 4/2007 | Wellbrock | H04L 9/0858 380/263 |
| 2007/0076888 | A1* | 4/2007 | Kuang | H04L 9/0858 380/278 |
| 2007/0130455 | A1* | 6/2007 | Elliott | H04B 10/70 713/150 |
| 2007/0133798 | A1* | 6/2007 | Elliott | H04B 10/70 380/255 |
| 2007/0140495 | A1* | 6/2007 | Berzanskis | H04L 9/065 380/278 |
| 2007/0234051 | A1* | 10/2007 | Akutsu | H04L 9/12 713/168 |
| 2007/0248362 | A1* | 10/2007 | Tanaka | H04B 10/505 398/189 |
| 2008/0013738 | A1* | 1/2008 | Tajima | H04L 9/0852 380/278 |
| 2008/0037790 | A1* | 2/2008 | Berzanskis | H04L 9/0852 380/278 |
| 2008/0144836 | A1 | 6/2008 | Sanders et al. | |
| 2008/0152147 | A1* | 6/2008 | Xia | H04B 7/18595 380/279 |
| 2008/0263363 | A1* | 10/2008 | Jueneman | G06F 21/32 713/184 |
| 2009/0003591 | A1* | 1/2009 | Murakami | H04L 9/0852 380/28 |
| 2009/0044170 | A1* | 2/2009 | Bernardi | G06F 8/61 717/105 |
| 2009/0064086 | A1* | 3/2009 | Faus | G06F 8/658 717/100 |
| 2009/0074192 | A1* | 3/2009 | Beal | H04L 9/0858 380/278 |
| 2009/0106553 | A1* | 4/2009 | Wang | A63B 7/00 713/168 |
| 2009/0169015 | A1* | 7/2009 | Watanabe | H04L 9/0858 380/278 |
| 2009/0271787 | A1* | 10/2009 | Clark | G06F 9/445 718/1 |
| 2009/0316901 | A1* | 12/2009 | Hayashi | H04L 9/0656 380/267 |
| 2010/0020964 | A1* | 1/2010 | Horie | G06F 7/725 380/44 |
| 2010/0023934 | A1* | 1/2010 | Sheehan | G06F 8/71 717/168 |
| 2010/0034390 | A1* | 2/2010 | Yamamoto | H04L 9/0858 380/278 |
| 2010/0138823 | A1* | 6/2010 | Thornley | G06F 8/61 717/174 |
| 2010/0158252 | A1* | 6/2010 | Youn | H04B 10/70 380/256 |
| 2010/0195831 | A1* | 8/2010 | Tanaka | H04B 10/548 380/256 |
| 2010/0208893 | A1* | 8/2010 | Toyoshima | H04L 9/0858 380/256 |
| 2010/0293380 | A1* | 11/2010 | Wiseman | H04L 9/0855 713/169 |
| 2010/0299526 | A1* | 11/2010 | Wiseman | H04L 9/0855 713/171 |
| 2011/0035747 | A1* | 2/2011 | Machida | G06F 8/63 718/100 |
| 2011/0055585 | A1* | 3/2011 | Lee | H04L 9/0844 713/183 |
| 2011/0064222 | A1* | 3/2011 | Wiseman | H04L 9/0827 380/255 |
| 2011/0075839 | A1* | 3/2011 | Noh | H04L 9/0858 380/44 |
| 2011/0126197 | A1* | 5/2011 | Larsen | H04L 9/3213 718/1 |
| 2011/0213979 | A1* | 9/2011 | Wiseman | H04L 9/0844 713/171 |
| 2011/0228937 | A1* | 9/2011 | Wiseman | H04L 9/0844 380/255 |
| 2011/0231665 | A1* | 9/2011 | Wiseman | H04L 9/0838 713/181 |
| 2011/0243331 | A1* | 10/2011 | Yasuda | H04L 9/0662 380/279 |
| 2011/0265164 | A1* | 10/2011 | Lucovsky | G06F 9/45533 726/7 |
| 2011/0271279 | A1* | 11/2011 | Pate | G06F 21/53 718/1 |
| 2011/0280405 | A1* | 11/2011 | Habif | H04B 10/70 380/278 |
| 2012/0087495 | A1* | 4/2012 | Revell | H04L 9/0841 380/47 |

(56) References Cited

U.S. PATENT DOCUMENTS

| | | | |
|---|---|---|---|
| 2012/0177201 A1* | 7/2012 | Ayling | H04B 10/70 380/278 |
| 2012/0195428 A1* | 8/2012 | Wellbrock | H04L 9/0855 380/255 |
| 2012/0246634 A1* | 9/2012 | Wright | G06F 9/44521 717/174 |
| 2012/0331463 A1* | 12/2012 | Orveillon | G06F 8/63 718/1 |
| 2013/0051559 A1* | 2/2013 | Baba | H04L 63/062 380/279 |
| 2013/0083926 A1* | 4/2013 | Hughes | H04L 9/0836 380/278 |
| 2013/0101119 A1 | 4/2013 | Nordholt et al. | |
| 2013/0101121 A1* | 4/2013 | Nordholt | H04L 9/0852 380/279 |
| 2013/0129087 A1* | 5/2013 | Qi | G06F 21/602 380/44 |
| 2013/0132950 A1* | 5/2013 | McLeod | G06F 8/63 718/1 |
| 2013/0232498 A1* | 9/2013 | Mangtani | G06F 9/5072 718/104 |
| 2013/0251145 A1* | 9/2013 | Lowans | H04L 9/0838 380/44 |
| 2013/0297922 A1* | 11/2013 | Friedman | G06F 8/63 713/2 |
| 2013/0315395 A1* | 11/2013 | Jacobs | H04L 9/0852 380/278 |
| 2014/0006580 A1* | 1/2014 | Raghu | G06F 9/5072 709/223 |
| 2014/0023192 A1* | 1/2014 | Tanizawa | H04L 9/0861 380/44 |
| 2014/0143443 A1* | 5/2014 | Takahashi | H04L 45/20 709/241 |
| 2014/0173594 A1* | 6/2014 | Ng | G06F 9/45533 718/1 |
| 2014/0208116 A1* | 7/2014 | Tanizawa | H04L 63/06 713/171 |
| 2014/0219443 A1* | 8/2014 | Brainis | H04L 9/0852 380/46 |
| 2014/0289520 A1* | 9/2014 | Tanizawa | H04L 45/14 713/168 |
| 2014/0331050 A1* | 11/2014 | Armstrong | H04L 9/0855 713/171 |
| 2014/0337640 A1* | 11/2014 | Sharma | H04L 9/0656 713/193 |
| 2015/0036819 A1* | 2/2015 | Arahira | H04L 9/0858 380/44 |
| 2015/0036824 A1* | 2/2015 | Dixon | H04L 9/0852 380/279 |
| 2015/0036825 A1* | 2/2015 | Tanizawa | H04L 9/0858 380/279 |
| 2015/0215122 A1* | 7/2015 | Takahashi | H04L 9/0855 380/283 |
| 2015/0222619 A1* | 8/2015 | Hughes | H04L 63/08 713/168 |
| 2015/0236852 A1* | 8/2015 | Tanizawa | H04L 9/0858 380/278 |
| 2015/0270959 A1* | 9/2015 | Tanizawa | H04B 10/70 380/30 |
| 2015/0271147 A1* | 9/2015 | Tanizawa | H04L 63/0428 713/171 |
| 2015/0365230 A1* | 12/2015 | Bovino | H04L 9/0852 380/256 |
| 2016/0098288 A1* | 4/2016 | Petrov | G06F 9/45558 718/1 |
| 2016/0112192 A1* | 4/2016 | Earl | H04L 9/0858 380/44 |
| 2016/0142203 A1* | 5/2016 | Tanizawa | H04L 9/0852 380/280 |
| 2016/0162338 A1* | 6/2016 | Sathyamurthy | G06F 9/5077 718/1 |
| 2016/0179850 A1* | 6/2016 | Martin | G06F 17/303 707/634 |
| 2016/0218867 A1* | 7/2016 | Nordholt | H04L 9/0852 |
| 2016/0226598 A1* | 8/2016 | Zhao | G09C 1/00 |
| 2016/0226846 A1* | 8/2016 | Fu | H04L 63/062 |
| 2016/0234009 A1* | 8/2016 | Li | H04L 9/001 |
| 2016/0269177 A1* | 9/2016 | Tanizawa | H04L 9/0858 |
| 2016/0277183 A1* | 9/2016 | Murakami | H04L 9/0858 |
| 2016/0328211 A1* | 11/2016 | Nordholt | H04L 9/0852 |
| 2016/0359625 A1* | 12/2016 | Tanizawa | H04L 9/0858 |
| 2016/0378519 A1* | 12/2016 | Gaurav | G06F 9/5077 718/1 |
| 2016/0378530 A1* | 12/2016 | Ramasubramanian | G06F 9/45558 718/1 |
| 2016/0379237 A1* | 12/2016 | Shapsa | G06Q 30/0206 705/7.35 |
| 2016/0380862 A1* | 12/2016 | Shapsa | H04L 43/04 709/224 |
| 2017/0003991 A1* | 1/2017 | Strandzhev | G06F 9/45558 |
| 2017/0075675 A1* | 3/2017 | Babol | G06F 8/64 |
| 2017/0109212 A1* | 4/2017 | Gaurav | G06F 9/45533 |
| 2017/0149880 A1* | 5/2017 | Lochhead | G06F 9/00 |
| 2017/0149931 A1* | 5/2017 | Lochhead | H04L 67/327 |
| 2017/0161023 A1* | 6/2017 | Khazanchi | G06F 8/20 |
| 2017/0161043 A1* | 6/2017 | Khazanchi | H04L 67/10 |
| 2017/0161057 A1* | 6/2017 | Khazanchi | G06F 8/70 |
| 2017/0161101 A1* | 6/2017 | Khazanchi | G06F 9/4843 |
| 2017/0163669 A1* | 6/2017 | Brown | H04L 63/1425 |
| 2017/0168714 A1* | 6/2017 | Saha | G06F 3/0604 |
| 2017/0214737 A1* | 7/2017 | Agarwal | G06F 9/45558 |
| 2017/0214738 A1* | 7/2017 | Agarwal | H04L 67/1002 |
| 2017/0228227 A1* | 8/2017 | Winterfeldt | G06F 8/60 |
| 2017/0228245 A1* | 8/2017 | Hardy | G06F 9/45558 |
| 2017/0230173 A1* | 8/2017 | Choi | H04L 9/0852 |
| 2017/0264433 A1* | 9/2017 | Tanizawa | H04L 63/061 |
| 2017/0270449 A1* | 9/2017 | Shrimali | G06Q 10/06315 |
| 2017/0288863 A1* | 10/2017 | Dimitrakos | G06F 21/6209 |

OTHER PUBLICATIONS

Extended European Search Report in European Application No. 16800453.9-1218/3286867 (PCT/US2016028280), pursuant to Rule 62 EPC, the Supplementary European Search Report (Art. 153(7) EPC) and the European Search Opinion, dated Mar. 21, 2018 (10 pgs.).

First Chinese Office Action issued by the State Intellectual Property Office of the People's Republic of China in corresponding Chinese Application No. 201510195062.7 dated Oct. 23, 2018 (19 pages)

* cited by examiner

200

┌─────────────────────────────────────────────────────────┐
│ The management device and the encryption machine negotiate a │
│ shared key pair through their respective quantum key distribution │ — 201
│ devices, in which the encryption machine carries a virtual │
│ encryption device, where a root key is to be injected, hosted by a │
│ cloud user │
└─────────────────────────────────────────────────────────┘
                              ↓
┌─────────────────────────────────────────────────────────┐
│ The management device generates a first root key component of │
│ the virtual encryption device, and uses a negotiated shared key │ — 202
│ to perform encryption transmission of the first root key │
│ component to the encryption machine │
└─────────────────────────────────────────────────────────┘
                              ↓
┌─────────────────────────────────────────────────────────┐
│ The terminal device and the encryption machine negotiate a │
│ shared key pair through their respective quantum key distribution │ — 203
│ devices │
└─────────────────────────────────────────────────────────┘
                              ↓
┌─────────────────────────────────────────────────────────┐
│ The terminal device generates a second root key component of │
│ the virtual encryption device, and uses a negotiated shared key │ — 204
│ to perform encryption transmission of the second root key │
│ component to the encryption machine │
└─────────────────────────────────────────────────────────┘
                              ↓
┌─────────────────────────────────────────────────────────┐
│ The encryption machine generates a third root key component of │ — 205
│ the virtual encryption device │
└─────────────────────────────────────────────────────────┘
                              ↓
┌─────────────────────────────────────────────────────────┐
│ The encryption machine synthesizes a root key of the virtual │
│ encryption device in accordance with the first root key │ — 206
│ component and the second root key component received and the │
│ third root key component generated by the encryption machine, │
│ and stores the root key │
└─────────────────────────────────────────────────────────┘

METHOD, APPARATUS, AND SYSTEM FOR CLOUD-BASED ENCRYPTION MACHINE KEY INJECTION

CROSS REFERENCE TO RELATED APPLICATION

The present application claims the benefits of priority to Chinese Application No. 201510195062.7, filed Apr. 22, 2015, the entire contents of which are incorporated herein by reference.

TECHNICAL FIELD

The present application relates to methods, apparatus, and systems for cloud-based encryption machine key injection.

BACKGROUND

Encryption machines are often used for protecting data privacy, especially in the banking industry. One of their main functions is key storage. A standard key system of the banking industry is a three-layer key system: ansi x9.17, which strictly limits the use of keys in different levels. The first layer is an encryption machine master key (also referred to as root key), the second layer is a bank master key (also referred to as user master key), and the third layer is a work key, which is also referred to as user work key or user data key.

The root key including three components is stored in a hardware encryption machine, and can be used to protect various keys stored outside the encryption machine and encryption keys of critical data. The role of the user master key is to encrypt a work key to be transmitted on a communication line. The user master key is typically under the encryption protection of a root key or is directly stored in the hardware encryption machine. The role of the user work key is to encrypt a variety of different data, so as to implement functions such as data privacy, information authentication and digital signature, and the user work key is under the encryption protection of the user master key or is directly stored in the hardware encryption machine.

Prior to use, it is necessary to inject a root key into the encryption machine. The encryption machine usually carries a set of IC cards (including an A card, a B card and a C card), and before startup, the management staff inserts the A card into a corresponding slot of the encryption machine and injects three components of the root key through an encryption machine panel menu or a management program provided by a manufacturer, each component being 32 hexadecimal numbers. Afterwards, the root key is stored in the A card and the B card, a user master key is then injected, and after related operations are completed, the user master key is stored in the C card. For a different encryption machine, the key injection process described above may vary but can be completed only by executing an operation of manually inserting a card.

In addition, with rapid development of cloud computing, data storage, data calculation and data applications are increasingly cloud-enabled, and how to guarantee security of sensitive data and critical applications of the cloud users is a major problem for the public cloud. The encryption machine introduced previously is one method of protecting data privacy. A cloud-enabled encryption machine is often desired. For example, users can host the encryption machine at a cloud provider, so as to protect the users' private business data on corresponding clouds.

The traditional manner of injecting a key by manually inserting a card is feasible in a situation where encryption machine devices are relatively few and the encryption machine is placed with a client. However, in the public cloud, the encryption machine is usually placed in a place away from a customer building for hosting, the number of the encryption machine devices increases greatly, and thus the traditional manner has many inconveniences: on the one hand, a cloud user needs to travel a long distance to the cloud provider to insert a card for injecting a key, and operation steps are cumbersome and waste time and energy; on the other hand, as various kinds of cloud users come into and go out of the cloud provider, management efficiency of the cloud provider is low and there are potential safety hazards, thus reducing the cloud users' trust in hosting the encryption machine at the cloud provider.

SUMMARY

One aspect of the present disclosure is directed to a cloud-based encryption machine key injection system. The key injection system includes at least one key injection sub-system including a key generation device and a quantum key distribution device connected with the key generation device, and a cloud-based encryption machine hosting sub-system including an encryption machine carrying a virtual encryption device and a quantum key distribution device connected with the encryption machine. The key injection sub-system and the encryption machine hosting sub-system are connected with each other through their respective quantum key distribution devices. The key generation device may generate a root key component and send the root key component via the quantum key distribution devices to the encryption machine. The encryption machine may receive root key components from one or more key generation devices and synthesize a root key of the virtual encryption device in accordance with the received root key components.

According to some embodiments, the quantum key distribution devices may negotiate a shared key pair between the key generation device and the encryption machine, and the quantum key distribution device of the at least one key injection sub-system may use a negotiated shared key to perform encryption transmission of the root key component to the encryption machine.

According to some embodiments, the at least one key injection sub-system includes one key injection sub-system, and the key generation device of the key injection sub-system may generate a number of root key components for the virtual encryption device and send the root key components via the quantum key distribution devices to the encryption machine. In some other embodiments, the encryption machine may generate one root key component for the virtual encryption device and synthesize the root key of the virtual encryption device in accordance with the received root key components from the at least one key injection sub-system and from the encryption machine.

According to some other embodiments, the at least one key injection sub-system includes a cloud-based management sub-system and a user sub-system located at a client terminal, the management sub-system includes a quantum key distribution device and a management device including the key generation device, and the user sub-system includes a quantum key distribution device and a terminal device including the key generation device.

According to some other embodiments, the encryption machine may synthesize a root key of the virtual encryption device in accordance with the received root key components by using a secret reconstruction algorithm based on a threshold secret sharing mechanism.

Another aspect of the present disclosure is directed to a key injection method for an encryption machine, implemented by a cloud based encryption machine key injection system. The method includes receiving, by the encryption machine, root key components, from at least one key injection sub-system, and synthesizing, by the encryption machine, a root key in accordance with the received root key components from the at least one key injection sub-system. The encryption machine may include a virtual encryption device, and the root key is for the virtual encryption device. Each of the root key components may be generated by a key generation device of the at least one key injection sub-system. The encryption machine may be connected to a quantum key distribution device, and each of the at least one key injection sub-system includes a quantum key distribution device. The root key components may be transmitted from the at least one key injection sub-system to the encryption machine via the quantum key distribution devices. The encryption machine may synthesize the root key in accordance with the received root key components by using a secret reconstruction algorithm based on a threshold secret sharing mechanism.

According to some embodiments, the key injection method may further include generating a root key component by the encryption machine. The encryption machine synthesizes the root key in accordance with the received root key components from the at least one key injection sub-systems and the root key component generated by the encryption machine.

According to some other embodiments, the key injection method may further include negotiating, by the encryption machine with each of the at least one key injection sub-system a shared key pair. The root key components from the at least one key injection sub-systems are encrypted with a key in the shared key pair.

The at least one key injection sub-system may include a cloud-based management sub-system and a user sub-system located at a client terminal, the cloud-based management sub-system including a key generation device, and the user sub-system including a key generation device.

Another aspect of the present disclosure is directed to a key injection apparatus for an encryption machine, the apparatus being deployed in a cloud-based encryption machine key injection system. The apparatus includes a shared key pair negotiation unit that negotiates a shared key pair with at least one key injection sub-system, a root key component generation unit that generates a root key component for a virtual encryption device on the encryption machine, and a root key synthesis unit that synthesizes a root key in accordance with the root key component generated by the root key component generation unit and root key components received from the at least one key injection sub-system. According to some embodiments, the at least one key injection sub-system and the encryption machine may include or be connected to quantum key distribution devices, and the root key components may be transmitted via the quantum key distribution devices respectively to the encryption machine.

Another aspect of the present disclosure is directed to a method for hosting a cloud-based encryption machine. The method includes sending, by a cloud user, an encryption machine hosting request to a management device located at the cloud through a terminal device, assigning, by the management device, a virtual encryption device hosted at the cloud to the cloud user in accordance with the received request, the virtual encryption device being carried by an encryption machine, and injecting a root key of the virtual encryption device into the encryption machine. The injecting the root key of the virtual encryption device into the encryption machine may include generating root key components of the virtual encryption device by the management device and the cloud user, and sending the root key components to the encryption machine, and synthesizing, by the encryption machine, a root key of the virtual encryption device in accordance with the received root key components.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 2 is a flow diagram illustrating a key injection method, according to an exemplary embodiment.

DETAILED DESCRIPTION

Figure 1A:
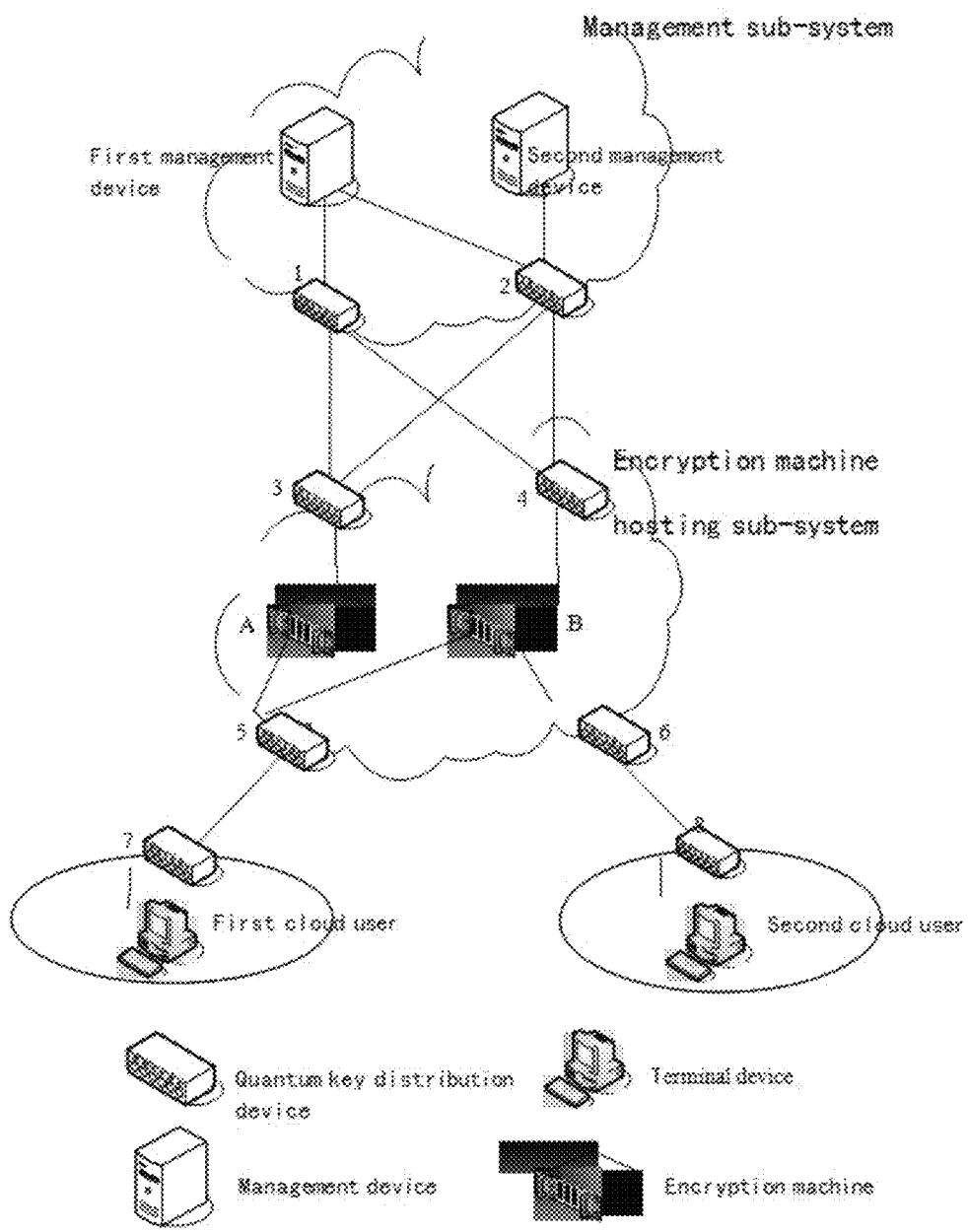
FIG. 1A is a graphical representation illustrating a cloud-based encryption machine key injection system, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

In the present application, a cloud-based encryption machine key injection system, a key injection method for an encryption machine and a corresponding apparatus, and a method for hosting an encryption machine at a cloud and a corresponding apparatus are provided, which are described below.

The cloud-based encryption machine key injection system provided in this example includes at least one key injection sub-system and an encryption machine hosting sub-system located at the cloud. The key injection sub-system includes: a key generation device, and a quantum key distribution device connected with the key generation device; the encryption machine hosting sub-system includes: an encryption machine as a virtual encryption device hosted by a cloud user, and a quantum key distribution device connected with the encryption machine. The key injection sub-system and the encryption machine hosting sub-system are connected with each other through their respective quantum key distribution devices.

In some embodiments, the encryption machine hosted at the cloud by the cloud user may be a physical encryption machine, and may also be a virtual encryption device carried by the encryption machine. A plurality of cloud users may share one encryption machine, and each cloud user that shares the same encryption machine owns a separate virtual encryption device. It may also be understood as follows: when one encryption machine is only assigned to one cloud user, the virtual encryption device hosted at the cloud by the cloud user is the encryption machine. As the difference between the above two hosting manners does not affect implementation of the technical solution of the present application, in order to facilitate description, the above two situations are not distinguished in the examples herein, and a description of using a virtual encryption device at the cloud by a cloud user is used in the following examples.

In some embodiments, on the basis of the foregoing system architecture, if the system only includes one key injection sub-system, the quantum key distribution devices in the key injection sub-system and the encryption machine hosting sub-system may negotiate, between the key generation device connected therewith and the encryption machine as the virtual encryption device, a shared key pair by using a quantum key distribution protocol (for example, BB84 protocol). The key generation device may generate root key components of the virtual encryption device in accordance with a number of preset root key components (also referred to as root key constituents), and use a negotiated shared key to perform encryption transmission of the root key components to the encryption machine as the virtual encryption device; and the encryption machine may decrypt the received root key components with the negotiated shared key, synthesize a root key of the virtual encryption device with the decrypted root key components, and store the root key. In some embodiments, the key injection sub-system may be a cloud-based management sub-system and may also be a user sub-system located at a client terminal.

The cloud user no longer needs to run to the encryption machine hosting region to execute the operation of manually inserting a card, and remote injection of the root key of the virtual encryption device is implemented. Since a quantum key serves as a cross product of quantum mechanics and cryptography, its security is ensured based on the principle of quantum mechanics and has nothing to do with computing power and storage capacity of an attacker, and thus security of the remote key injection process is sufficiently ensured.

In some embodiments, in order to further ensure the security of the root key of the virtual encryption device and also take the cloud user's trust in the cloud provider into account, the number of the key injection sub-system may be less than the greatest integer of the number of preset root key components. The key generation device in each key injection sub-system may generate one root key component of the virtual encryption device. The encryption machine is responsible for generating one root key component of the virtual encryption device, and synthesizing a root key of the virtual encryption device in accordance with the root key component received from each key injection sub-system and the root key component generated by the encryption machine.

The foregoing implementation manner of the system is described below in detail in combination with a traditional encryption machine key system with a relatively popular application, for example, a financial encryption machine key system. The traditional encryption machine key system is made up of three layers: a root key, a user master key and a user work key, in which the root key is composed of three components. The system includes two key injection sub-systems: a cloud-based management sub-system and a user sub-system (also called a cloud user) located at a client terminal. The management sub-system includes: a quantum key distribution device and a management device that undertakes a function of the key generation device. The user sub-system includes: a quantum key distribution device and a terminal device that undertakes a function of the key generation device.

Figure 1B:
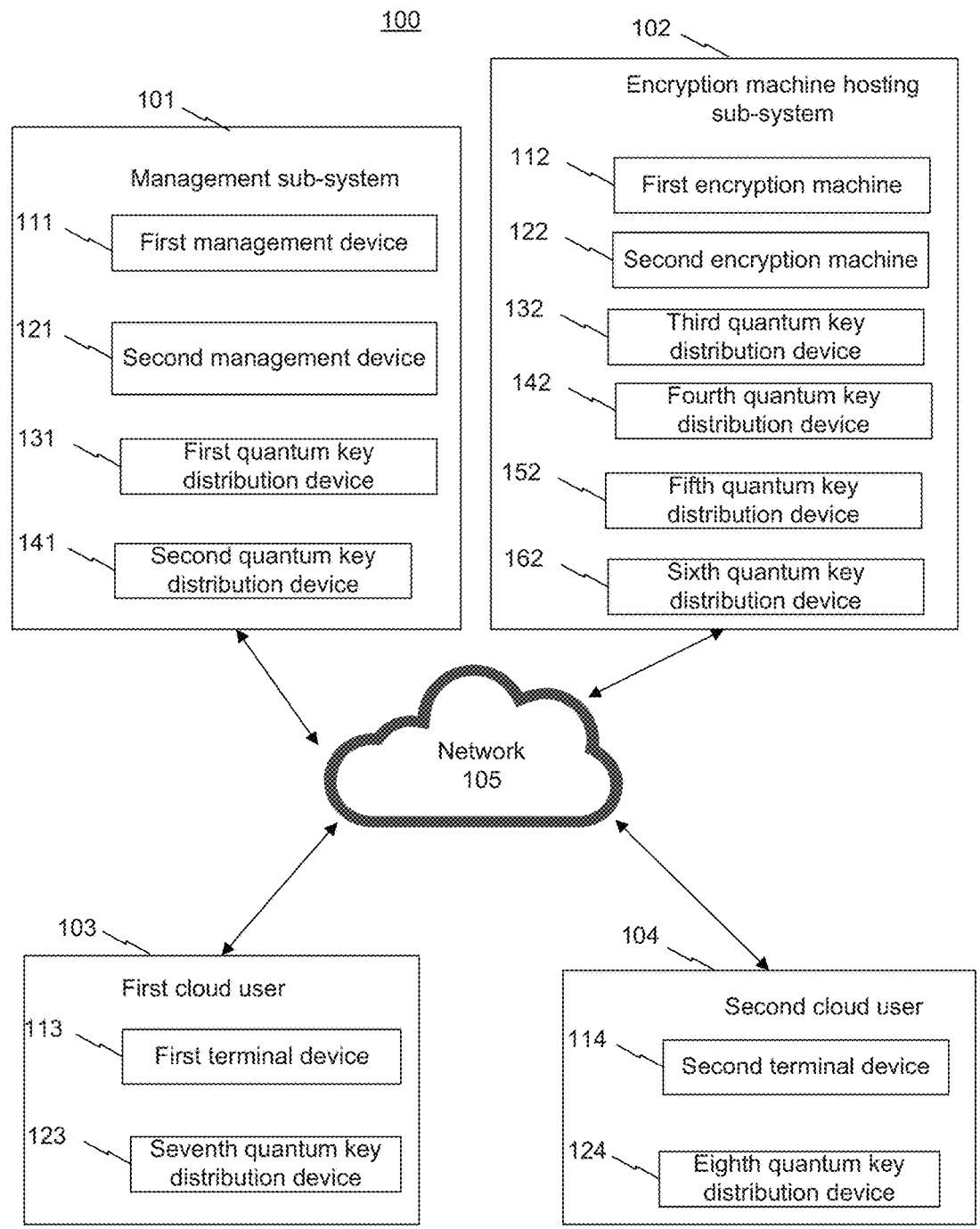
FIG. 1B is a block diagram illustrating a cloud-based encryption machine key injection system, according to an exemplary embodiment.

FIGS. 1A and 1B show a block diagram of a cloud-based encryption machine key injection system 100 in different views. The system includes a number of components and sub-components, some of which are optional.

The system 100 may include a management sub-system 101, an encryption machine hosting sub-system 102, a first cloud user 103, and a second cloud user 104, all connected through a network 105. In some embodiments, the management sub-system 101 may also be referred to as an encryption machine hosting platform management center of a cloud provider. The management sub-system 101 may include a first management device 111 and a second management device 121. The management devices 111 and 121 can be responsible for security monitoring, identification, authorized hosting, audit and the like of the encryption machine. The management devices 111 and 121 can include key generation devices for generating root key components and remotely inject the root key components into the encryption machine to make the root key for the virtual encryption device. The management sub-system 101 further includes a first quantum key distribution device 131 and a second quantum key distribution device 141 connected with the aforementioned management devices 111 and 121 respectively. The encryption machine hosting sub-system 102 may also be referred to as an encryption machine hosting region, including a first encryption machine 112 and a second encryption machine 122 that each carry a virtual encryption device. The encryption machine hosting sub-system 102 may include a third quantum key distribution device 132 and a fourth quantum key distribution device 142 connected to the first and second encryption machines 112 and 122 respectively. The third quantum key distribution device 132 and the fourth quantum key distribution device 142 are also connected to the first and second quantum key distribution devices 131 and 141, as shown in FIG. 1A. The encryption machine hosting sub-system 102 may further include a fifth quantum key distribution device 152 and a sixth quantum key distribution device 162 connected to the cloud users' quantum key distribution devices via network 105.

The first cloud user 103 includes a first terminal device 113 and a seventh quantum key distribution device 123. The second cloud user 104 includes a second terminal device 114 and an eighth quantum key distribution device 124. The first and second terminal devices 113 and 114 may include key generation devices for generating root key components. As shown in FIG. 1A, the seventh quantum key distribution device 123 and eighth quantum key distribution device 124 may be respectively connected to the fifth quantum key distribution device 152 and sixth quantum key distribution device 162 via network 105. The first and second cloud users may each be a group of devices used by an individual based on a cloud service, and may also be used by enterprise based on the cloud service.

In one example, the first encryption machine 112 carries a virtual encryption device, where a root key is to be injected, hosted by the first cloud user at the cloud. The first management device 111 in the management sub-system 101 is responsible for injecting one root key component into the virtual encryption device. The first and third quantum key distribution devices 131 and 132 may negotiate, between the first management device 111 in the management sub-system 101 and the first encryption machine 112 in the encryption machine hosting sub-system 102, a shared key pair. The first management device 111 may generate a first root key component of the virtual encryption device through an operation of an administrator of the cloud provider or through an installed key generation and management program, and use a negotiated shared key to perform encryption transmission of the first root key component to the first encryption machine 112. The first encryption machine 112 uses the same negotiated shared key for decryption, so as to acquire the first root key component injected by the management sub-system 101.

The fifth and seventh quantum key distribution devices 152 and 123 may negotiate, between the first terminal device 113 of the first could user 103 and the first encryption machine 112, a shared key pair. The terminal device 113 of the first could user 103 may generate a second root key component of the virtual encryption device through an operation of the first could user 103 or through an installed key generation and management program, and use a negotiated shared key to perform encryption transmission of the second root key component to the first encryption machine 112. The first encryption machine 112 uses the same negotiated shared key for decryption, so as to acquire the second root key component injected by the user sub-system 101.

The first encryption machine 112 may randomly generate a third root key component of the virtual encryption device through a key generation module or a tool carried by the first encryption machine 112. The first encryption machine 112 may receive root key components from one or more key generation devices and synthesize a root key of the virtual encryption device in accordance with the first root key component and the second root key component injected by the management sub-system 101 and the first could user 103, and the third root key component generated by the first encryption machine 112. The first encryption machine 112 may synthesize the root key by using different algorithms. For example, the root key may be synthesized by using the three root key components in a manner of addition modulo 2 or a manner of bitwise exclusive-OR, or in a more complicated manner, for example, the root key being synthesized by using a secret reconstruction algorithm based on a threshold secret sharing mechanism.

As described above, the cloud provider management sub-system, the cloud user, and the encryption machine each contribute a component for generating the root key. This mechanism decentralizes the rights to generate the root key components. Even if any of the three sides leaks a root key component, security of root key, and thus the services and data of the cloud user at the cloud, will not be endangered, so that the cloud user's trust in the cloud provider is enhanced.

The traditional encryption machine key system usually may include a user master key. It is feasible to store the user master key into the encryption machine. The terminal device (e.g., terminal device 113) of the user sub-system may generate a user master key through an operation of the cloud user or through an installed key generation and management program, and use a negotiated shared key to perform encryption transmission of the user master key to the encryption machine. Correspondingly, the encryption machine may store the received user master key as a user master key of the virtual encryption device.

The traditional encryption machine key system may further include a user work key. It is also feasible to store the user work key into the encryption machine. The terminal device (e.g., terminal device 113) of the user sub-system may generate a user work key through an operation of the cloud user or through an installed key generation and management program, and use a negotiated shared key to perform encryption transmission of the user work key to the encryption machine as the virtual encryption device. Correspondingly, the encryption machine may store the received user work key as a user work key of the virtual encryption device.

In some embodiments, the key generations or the key component generations as described above can be implemented by key generation devices included in the management devices (e.g., the first management device 111) and a user's terminal device (e.g., terminal device 113). The key generation devices may also perform encryption transmission of the key components or the keys to the encryption machine. For example, in some embodiments, if the quantum key distribution device does not have a data encryption and decryption function, the key generation device encrypts the root key components or other keys in accordance with a negotiated quantum key provided to it by the quantum key distribution device, and then transmits the root key components or other keys to the encryption machine via a classical channel between the key generation device and the encryption machine. The encryption machine executes a decryption operation to obtain the root key components or the other keys. If the quantum key distribution device has the data encryption and decryption function, that is, the quantum key distribution device is a quantum encryption machine, the key generation device can send the root key components or other keys to a quantum key distribution device connected therewith, and the quantum key distribution device uses a negotiated quantum key for encryption and transmits the encrypted root key components or other keys to the quantum key distribution device at the side of the encryption machine via a classical channel. The quantum key distribution device executes a decryption operation and sends the decrypted root key components or the other keys to the encryption machine.

The user sub-system may own its own quantum key distribution device or rent a quantum key distribution device at the cloud. The physical position of the quantum key distribution device of the user sub-system may not be at the client terminal side but at the cloud. In this case, the terminal device may log into the quantum key distribution device via, for example, VPN, to implement the above-described operations including, for example, acquiring a negotiated shared key or sending a root key component to be injected or a user master key or the like to the quantum key distribution device associated with the encryption machine.

FIGS. 1A and 1B merely illustrate a schematic system architectural diagram of an encryption machine key injection system based on the embodiments of the present application. A person having ordinary skill in the art should appreciate that many changes can be made based on a user's desires. For example, the number of the management device in the management sub-system and the number of the encryption machine in the encryption machine hosting sub-system can be configured in accordance with specific demands; the management sub-system and the encryption machine hosting sub-system may be located at the same network domain at the cloud and may also be located at different network domains, and their quantum key distribution devices can be connected with each other through a routing device having a quantum key relaying function. For another example, the quantum key distribution devices may be omitted, and in this example, the management devices and the terminal devices may negotiate the shared key pairs with the encryption machine. For a further example, as a complete system, a maintenance sub-system may also be included, and the maintenance sub-system can perform initial authorization to the virtual encryption device on the encryption machine carries by an encryption machine device manufacturer. The maintenance sub-system can also perform fault monitoring and maintenance on the encryption machines.

The cloud-based encryption machine key injection system provided in this example organically combines a quantum key technology with a cloud-enabled encryption machine technology. Such an injection system changes the traditional manner of manually inserting a card to inject a root key, achieves remote injection of an encryption machine root key, and ensures security of the remote injection process by quantum cryptography. The injection system thus exempts the necessity that the cloud user goes to a hosting region to manually insert a card, simplifies the operation process of key injection, facilitates a cloud provider to manage the hosting region, and enhances the security of the keys generated by the encryption machine at the cloud. In particular, for example, if more than one key injection sub-system and encryption machine jointly participate in a generation process of root key components, the security of a root key can be substantially improved, and the cloud user's trust in the cloud provider can be further enhanced.

The present application further provides a key injection method for an encryption machine, in which the method is implemented in the aforementioned cloud-based encryption machine key injection system.

In some embodiments, for a virtual encryption device carried by an encryption machine, where a root key is to be injected, in order to achieve remote safe injection of a root key thereof, the method includes the following steps:

1) negotiating, by the key generation device of the key injection sub-system and the encryption machine of the encryption machine hosting sub-system, a shared key pair through their respective quantum key distribution devices, in which the encryption machine carries the virtual encryption device, where a root key is to be injected, hosted by a cloud user at the cloud;

2) generating, by the key generation devices, root key components of the virtual encryption device, and using the negotiated shared key to perform encryption transmission of the root key components to the encryption machine; and 3) synthesizing, by the encryption machine, a root key of the virtual encryption device in accordance with the received root key components, and storing the root key.

In some embodiments, it is feasible that a key injection sub-system (for example, a cloud-based management sub-system or a user sub-system located in a client terminal) generates all the root key components for the virtual encryption device in accordance with a number of preset root key components that may be needed and uses a negotiated shared key to perform encryption transmission of the all root key components to the virtual encryption device on the encryption machine, and the encryption machine decrypts all the root key components and the synthesizes and stores a root key of the virtual encryption device in accordance with the all components received.

In some embodiments, it is also feasible that more than one key injection sub-system and encryption machine jointly participate in the generation of the root key components, and in this case, the encryption machine synthesizes the root key in accordance with the root key components received from different key injection sub-systems and the root key component generated by the encryption machine.

In order to enhance security of the root key and the cloud user's trust in the cloud provider, this example focuses on describing the latter implementation. In this implementation, the number of the key injection sub-system is less than the greatest integer of the number of preset root key components that are needed. In some embodiments, the key generation device, which is responsible for generating a root key component, can be implemented in a key injection sub-system. The key generation device can complete a quantum key agreement with the encryption machine. The key generation device of each key injection sub-system can generate a root key component and performs encryption transmission of the root key component to the encryption machine. The encryption machine can also generate a root key component. The encryption machine then synthesizes a root key of the virtual encryption device in accordance with the aforementioned root key components.

FIG. 2 is a flow diagram of an example of a key injection method 200 for an encryption machine according to the present application. The contents of this example which are the same as those of the example of the cloud-based encryption machine key injection system provided previously are not repeated, and the following focuses on their differences. The key injection method for an encryption machine according to the present application includes:

Step 201: The management device (e.g., the first management device 111 in FIG. 1B) and the encryption machine (e.g., the first encryption machine 112 in FIG. 1B) negotiate a shared key pair through their respective quantum key distribution devices. The encryption machine includes a virtual encryption device, where a root key is to be injected, hosted by a cloud user at a cloud.

In some embodiments, in order to ensure security of a key agreement process and a subsequent root key component injection process, before execution of the quantum key agreement, the management device and the encryption machine may first perform mutual identity authentication. The management device can send an identity authentication request to the encryption machine, the request carrying a private key signature identity certificate of the management device. The encryption machine, after receiving the identity authentication request, decrypts the private key signature identity certificate with a public key corresponding to the management device, and if the decryption is successful, it indicates that the identity of the management device is valid. For the same reason, the encryption machine may also send a private key signature identity certificate of the virtual encryption device that the encryption machine carries to the management device, and the management device uses the same method to verify the identity of the virtual encryption device. In the foregoing mutual identity authentication process, if identity authentication of any side fails, execution of the method is ended.

The above gives an identity authentication manner based on a public/private key pair. While in other implementations, it is also feasible to perform identity authentication in other manners. For example, the encryption machine can send a device identifier (for example, a sequence number preset by a device manufacturer) of the virtual encryption device to the management device, and the management device performs identity authentication on the virtual encryption device by using the device identifier. The public/private key pairs and identity certificates of the management device and the virtual encryption device, the device identifier and other information may be preset in the management device and the virtual encryption device.

In some embodiments, if the management device and the virtual encryption device both pass the identity authentication of the other, the management device and the encryption machine can negotiate a shared key pair in accordance with a quantum key distribution protocol, for example, a BB84 protocol, through their respective quantum key distribution devices.

Step 202: The management device generates a first root key component of the virtual encryption device, and uses a negotiated shared key to perform encryption transmission of the first root key component to the encryption machine.

In some embodiments, the management device may generate the first root key component of the virtual encryption device through an operation of an administrator of the cloud provider or through an installed key generation and management program, and use a shared key negotiated in step 201 to perform encryption transmission of the first root key component to the encryption machine. The data encryption and decryption functions may be completed by the corresponding management device or encryption machine and may also be completed by a quantum key distribution device. Reference can be made to the related description in the examples of the cloud-based encryption machine key injection system provided above.

Step 203: The terminal device and the encryption machine negotiate a shared key pair through their respective quantum key distribution devices.

In some embodiments, before execution of a quantum key agreement of the step, the terminal device and the encryption machine may first perform mutual identity authentication between the terminal device and the virtual encryption device, and reference can be made to the description in step 201 for the specific processing flow thereof with respect to the management device and the encryption machine. If the terminal device and the virtual encryption device both pass the identity authentication of the other, the terminal device and the encryption machine can negotiate a shared key pair in accordance with a quantum key distribution protocol, for example, a BB84 protocol, through their respective quantum key distribution devices.

Step 204: The terminal device generates a second root key component of the virtual encryption device, and uses a negotiated shared key to perform encryption transmission of the second root key component to the encryption machine.

In some embodiments, the terminal device may generate the second root key component of the virtual encryption device through an operation of a cloud user or through an installed key generation and management program, and use a shared key negotiated in step 203 to perform encryption transmission of the second root key component to the encryption machine, in which the data encryption and decryption function may be completed by the corresponding terminal device or encryption machine and may also be completed by a quantum key distribution device. Reference can be made to the related description in the examples of the cloud-based encryption machine key injection system provided above.

Step 205: The encryption machine generates a third root key component of the virtual encryption device.

In some embodiments, the encryption machine can randomly generate a third root key component of the virtual encryption device through a key generation module or tool carried by the encryption machine.

Step 206: The encryption machine synthesizes a root key of the virtual encryption device in accordance with the first root key component from the management device and the second root key component from the user terminal device and the third root key component generated by the encryption machine, and stores the root key.

In some embodiments, the encryption machine can complete the operation of synthesizing a root key of the step by using a preset algorithm, and store the synthesized root key as a root key of the virtual encryption device that the encryption machine carries. Reference can be made to the related description in the examples of the cloud-based encryption machine key injection system provided previously for the description about the synthesis algorithm.

In some embodiments, remote injection of the root key is achieved through aforementioned steps 201 to 206. Further, the method can also achieve remote injection of a user master key and a user work key. After this step, the following operations can be further executed:

1) The terminal device generates a user master key, and uses the negotiated shared key to perform encryption transmission of the user master key to the encryption machine; and the encryption machine stores the received user master key as a user master key of the virtual encryption device.

2) The terminal device generates a user work key, and uses the negotiated shared key to perform encryption transmission of the user work key to the encryption machine; and the encryption machine stores the received user work key as a user work key of the virtual encryption device.

The key generation device of the key injection sub-system generates root key components of the virtual encryption device and uses a shared key negotiated through quantum key distribution devices to perform encryption transmission of the root key components to the encryption machine, and the encryption machine synthesizes a root key of the virtual encryption device, so as to achieve remote safe injection of the root key, exempt the necessity that a cloud user goes to a hosting region to manually insert a card and simplify the operation process of key injection. In particular, for example, if more than one key injection sub-system and encryption machine jointly participate in a generation process of root key components, not only security of a root key can be improved, but also the cloud user's trust in the cloud provider can be further enhanced.

In the foregoing example, a key injection method for an encryption machine is provided, and corresponding thereto, the present application further provides a key injection apparatus for an encryption machine.

Figure 3:
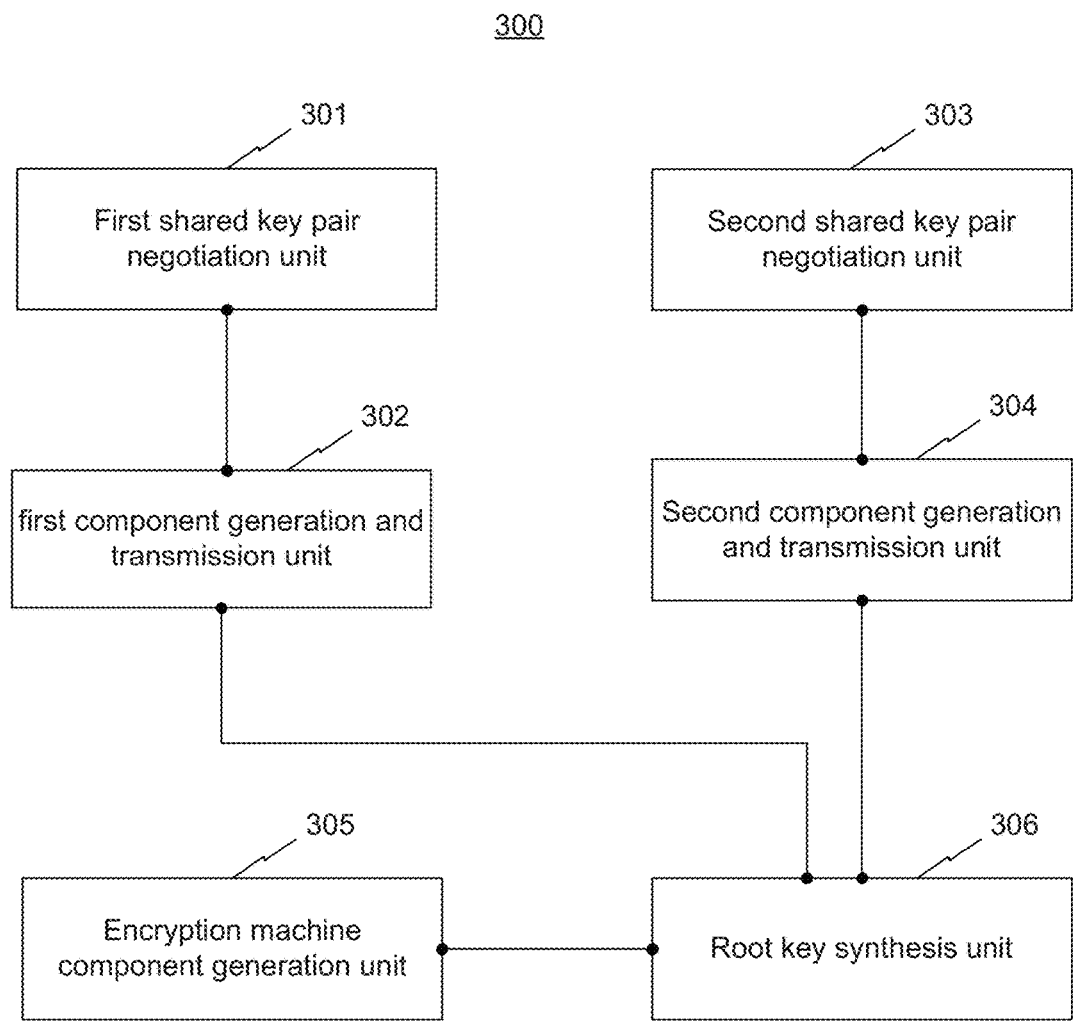
FIG. 3 is a block diagram illustrating a key injection apparatus, according to another exemplary embodiment.

FIG. 3 is a block diagram of an example of a key injection apparatus 300 for an encryption machine according to the present application. As the apparatus example is basically similar to the method example, description thereof is relatively simple, and reference can be made to the corresponding description of the method example for related contents. The apparatus example described below is merely schematic.

A key injection apparatus for an encryption machine of this example includes: a first shared key pair negotiation unit 301 that negotiates, by the management device and the encryption machine, a shared key pair through their respective quantum key distribution devices; a first component generation and transmission unit 302 that generates, by the management device, a first root key component of the virtual encryption device, and uses a negotiated shared key to perform encryption transmission of the first root key component to the encryption machine; a second shared key pair negotiation unit 303 that negotiates, by the terminal device and the encryption machine, a shared key pair through their respective quantum key distribution devices; a second component generation and transmission unit 304 that generates, by the terminal device, a second root key component of the virtual encryption device, and uses a negotiated shared key to perform encryption transmission of the second root key component to the encryption machine; an encryption machine component generation unit 305 that generates, by the encryption machine, a third root key component of the virtual encryption device; and a root key synthesis unit 306 that synthesizes, by the encryption machine, a root key of the virtual encryption device in accordance with the root key component received from each component generation and transmission unit and the root key component generated by the encryption machine component generation unit, and stores the root key.

In some embodiments, the apparatus may further include:
a user master key generation and transmission unit that generates, by the terminal device, a user master key, and uses a negotiated shared key to perform encryption transmission of the user master key to the encryption machine; and
a user master key storage unit that stores, by the encryption machine, the received user master key as a user master key of the virtual encryption device.

In some embodiments, the apparatus may further include:
a user work key generation and transmission unit that generates, by the terminal device, a user work key, and uses the negotiated shared key to perform encryption transmission of the user work key to the encryption machine; and
a user work key storage unit that stores, by the encryption machine, the received user work key as a user work key of the virtual encryption device.

In some embodiments, the apparatus may further include:
a first identity authentication unit that, before the first shared key pair negotiation unit is triggered to work, performs mutual identity authentication between the management device and the virtual encryption device that the encryption machine carries; and if identity authentication of any side fails, ends the work of the apparatus.

In some embodiments, the apparatus may further include:
a second identity authentication unit that, before the second shared key pair negotiation unit is triggered to work, performs mutual identity authentication between the terminal device and the virtual encryption device that the encryption machine carries; and if identity authentication of any side fails, ends the work of the apparatus.

The first identity authentication unit and the second identity authentication unit may perform identity authentication in the following manner:
a request authenticator device (e.g., one of the first identity authentication unit and the second identity authentication unit) sends an identity authentication request to a peer device (e.g., the other of the first identity authentication unit and the second identity authentication unit), the request carrying a private key signature identity certificate of the request authenticator device; and the peer device, after receiving the identity authentication request, decrypts the private key signature identity certificate with a public key corresponding to the request authenticator device, and if the decryption is successful, the request authenticator device passes identity authentication.

In some embodiments, optionally, the root key synthesis unit may, synthesize, by the encryption machine, the root key of the virtual encryption device by using a secret reconstruction algorithm based on a threshold secret sharing mechanism, and store the root key.

A cloud-based encryption machine key injection system and a key injection method for an encryption machine are provided in the foregoing examples, and on this basis, the present application further provides a method for hosting an encryption machine at the cloud.

Figure 4:
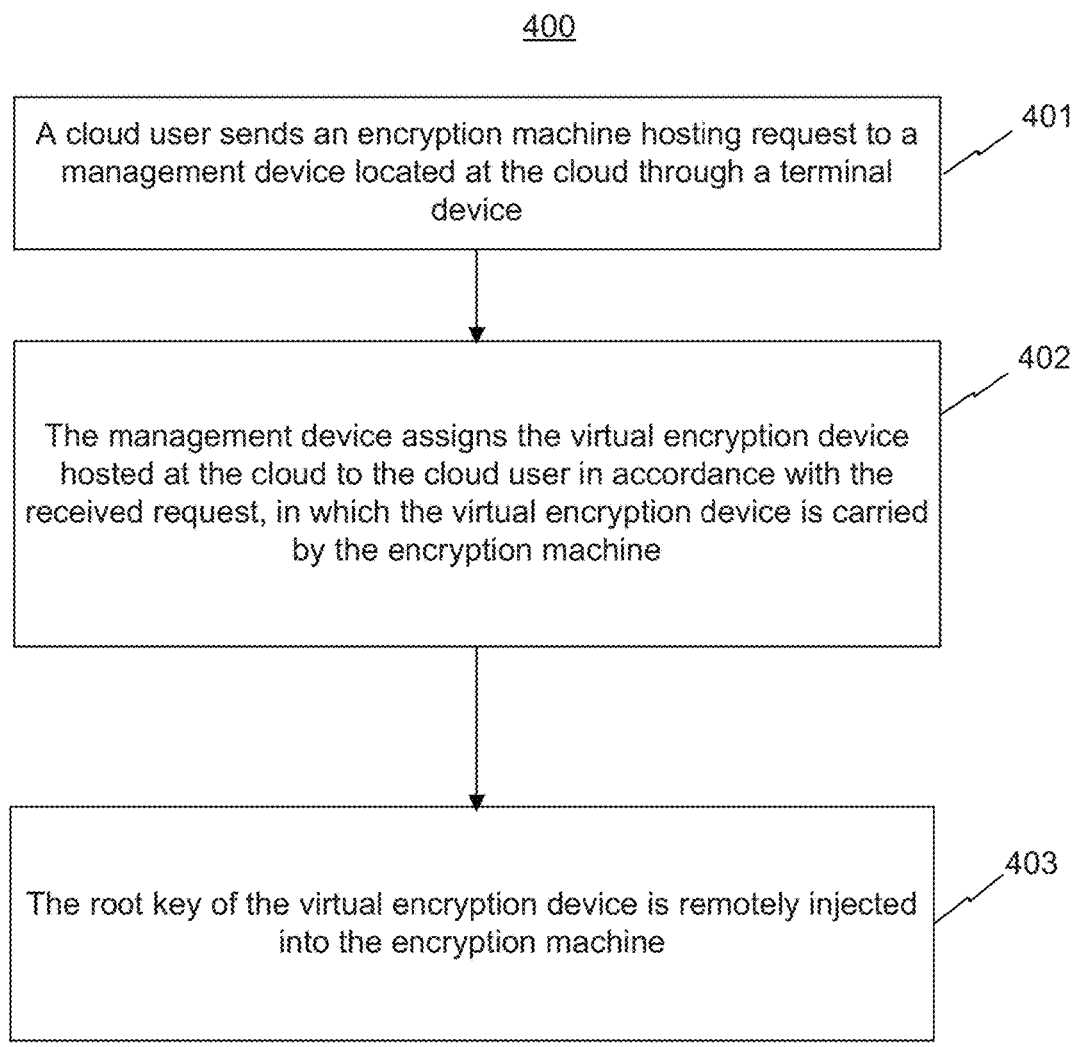
FIG. 4 is a flow diagram illustrating a method for hosting a cloud-based encryption machine, according to an exemplary embodiment.

FIG. 4 is a flow diagram of an example of a method 400 for hosting an encryption machine at the cloud according to the present application, the contents of this example which are the same as those of the foregoing examples are not repeated, and the following focuses on their differences. The method for hosting an encryption machine at the cloud according to the present application includes:

Step 401: A cloud user sends an encryption machine hosting request to a management device located at the cloud through a terminal device.

With migration of the cloud user's data and business to the cloud, the cloud user usually hopes to own his/her own encryption machine at the cloud and to provide reliable protection for encryption/decryption keys or business data stored at the cloud through a key stored in the encryption machine. In the background of the foregoing demands, a cloud provider can provide an encryption machine hosting service at the cloud, and the cloud user can send an encryption machine hosting request to a management device located at the cloud through a terminal device according to requirements.

In order to make it convenient to execute a security operation related to identity authentication in a subsequent operation process, before the cloud user sends the encryption machine hosting request to the management device located at the cloud through the terminal device, the following system initialization operations can be executed:
presetting, by a cloud provider administrator, a public/private key pair for identity authentication and an identity certificate for the management device; presetting, by the cloud user (including an administrator of an enterprise that uses a cloud service), a public/private key pair for identity authentication and an identity certificate for the terminal device thereof; and presetting, by an encryption machine device manufacturer, a public/private key pair for identity authentication, an identity certificate and a device identifier for the virtual encryption device carried in the encryption machine. The above public key is made public, and the private key may sign an identity certificate. The above preset information related to the identity authentication can be stored in an exclusive encryption machine of the corresponding device and can also be stored in another manner, and when the subsequent steps are executed, the above identity authentication information can be used to verify the identity of the devices that participate in the operation (please refer to step 403).

Step 402: The management device assigns the virtual encryption device hosted at the cloud to the cloud user in accordance with the received request, in which the virtual encryption device is carried by the encryption machine.

In some embodiments, the management device assigns a corresponding encryption machine to the cloud user in accordance with the received encryption machine hosting request. The encryption machine that the management device assigns to the cloud user may be an encryption machine that owns a separate physical space and may also be a virtual encryption device carried by the encryption machine, that is, a plurality of cloud users may share one encryption machine, and each cloud user that shares the same encryption machine owns a separate virtual encryption device. In some embodiments, the above two assignment manners do not affect implementation of the technical solution, and in order to facilitate description, a virtual encryption device is used in this example.

After completing the foregoing assignment operation, the management device can send an acknowledgement indicating that the assignment has been completed to the terminal device, and send a device identifier of the virtual encryption device to the terminal device at the same time, so as to facilitate the cloud user to monitor use and security conditions of the virtual encryption device assigned thereto at any time in the future. The device identifier of the virtual encryption device refers to identification information preset by the encryption machine device manufacturer for each virtual encryption device available for assignment at a system initialization stage and that uniquely identifies the virtual encryption device, for example, a sequence number.

After receiving the device identifier information, the terminal device can verify validity of the virtual encryption device with the encryption machine device manufacturer. Two exemplary verification manners may be used: the terminal device sends a verification request to the corresponding encryption machine device manufacturer, and carries the device identifier to be verified, and the encryption machine device manufacturer, after executing a verification operation, feeds back the verification result to the terminal device; a website for device authentication provided by the encryption machine device manufacturer is accessed through the terminal device, and query is carried out in accordance with the device identifier. If the verification result fed back by the encryption machine device manufacturer or the query result indicates that the virtual encryption device has passed the validity verification, the subsequent step 403 can be executed to inject the root key of the virtual encryption device into the encryption machine; and otherwise, the terminal can notify the management device that the virtual encryption device does not pass the validity verification, and execution of the subsequent step of injecting the root key is not continued.

In some embodiments, in order to ensure security of the device identifier information, the management device can negotiate a shared key pair with the terminal device through their respective quantum key distribution devices before sending a device identifier to the terminal device; then the management device uses a negotiated shared key to encrypt the device identifier, and sends the encrypted device identifier to the terminal device. Correspondingly, the terminal device uses the negotiated shared key to decrypt the received device identifier, and uses the decrypted device identifier to execute the verification operation.

Step 403: The root key of the virtual encryption device is remotely injected into the encryption machine.

In this step, the key injection method for an encryption machine provided in the present application is used to complete the operation of injecting the root key, and reference can be made to the description in the corresponding examples for specific description thereof, which is not repeated herein.

In some embodiments, if, in step 402, more than one virtual encryption device is assigned to the cloud user in accordance with the demand of the cloud user, in this step, it is feasible to inject a root key for each virtual encryption device sequentially in a manner of remote injection.

The cloud user sends an encryption machine hosting request to the management device at the cloud through the terminal device, and it is feasible to host a virtual encryption device at the cloud and implement an operation of injecting a root key in a manner of remote injection. It can be seen that the method provides a new idea of cloud-enabling encryption machine, which not only facilitates the cloud user to host the virtual encryption device at the cloud, but also exempts the necessity that the cloud user goes to a hosting region to manually insert a card, simplifies the operation process of key injection, facilitates a cloud provider to manage the hosting region, and enhances the cloud user's trust in hosting the encryption machine at the cloud.

In the foregoing example, a method for hosting an encryption machine at the cloud is provided. The present application further provides an apparatus for hosting an encryption machine at the cloud.

Figure 5:
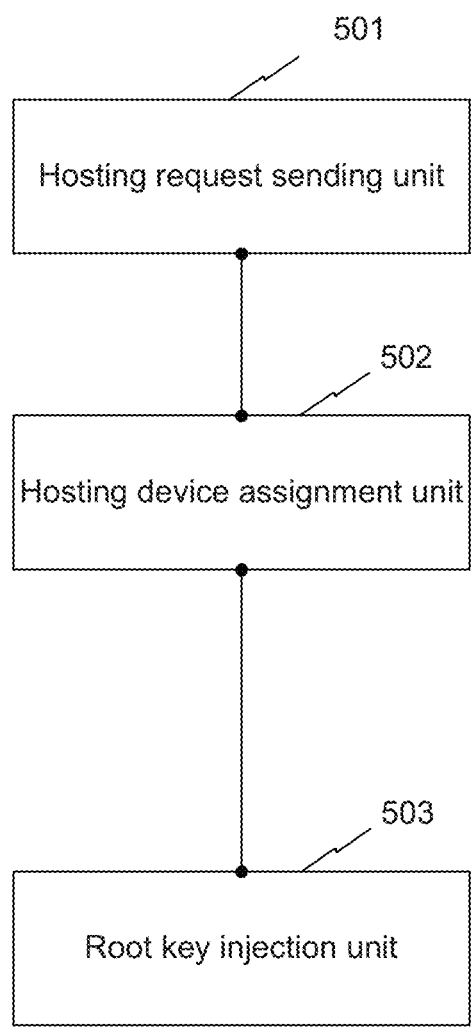
FIG. 5 is a block diagram illustrating an apparatus for hosting a cloud-based encryption machine, according to another exemplary embodiment.

FIG. 5 is a block diagram of an example of an apparatus 500 for hosting an encryption machine at the cloud according to the present application. As the apparatus example is basically similar to the method example, description thereof is relatively simple, and reference can be made to the corresponding description of the method example for related contents. The apparatus example described below is merely schematic.

An apparatus for hosting an encryption machine at the cloud of this example includes: a hosting request sending unit 501 that sends, by a cloud user, an encryption machine hosting request to a management device located at the cloud through a terminal device; a hosting device assignment unit 502 that assigns, by the management device, a virtual encryption device hosted at the cloud to the cloud user in accordance with the received request, the virtual encryption device being carried by an encryption machine; and a root key injection unit 503 that remotely injects a root key of the virtual encryption device into the encryption machine by using the aforementioned key injection apparatus for an encryption machine.

In some embodiments, the apparatus may include: an initialization unit that, before the hosting request sending unit is triggered to work, executes an initialization operation; the unit including:

a management and terminal device initialization subunit that presets, by a corresponding administrator, a public/private key pair for identity authentication and an identity certificate for the management device and the terminal device; and a virtual encryption device initialization subunit that presets, by an encryption machine device manufacturer, a public/private key pair for identity authentication, an identity certificate and a device identifier for the virtual encryption device carried in the encryption machine.

In some embodiments, the apparatus may further include:

a device identifier sending unit that, after the hosting device assignment unit completes the operation of assigning the virtual encryption device, sends, by the management device, the device identifier of the virtual encryption device to the terminal device; and a device validity verification unit that verifies, by the terminal device, validity of the virtual encryption device to the encryption machine device manufacturer with the received device identifier; and if the virtual encryption device passes the validity verification, allows the root key injection unit to work.

In some embodiments, the apparatus may further include:

a shared key agreement unit that, after the hosting device assignment unit completes the operation of assigning the virtual encryption device, negotiates, by the management device and the terminal device, a shared key pair through their respective quantum key distribution devices;

correspondingly, the device identifier sending unit that encrypts, by the management device, the device identifier with a negotiated shared key, and sends the encrypted device identifier to the terminal device; and the device validity verification unit that decrypts, by the terminal device, the received device identifier with the negotiated shared key, and executes the verification operation by using the decrypted device identifier.

The specification has described methods, apparatus, and systems for encryption machine key injection. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media. The units, systems, and devices described above may be implemented in a form of software, hardware, firmware, or any combination of software, hardware, and firmware. For examples, the units, systems, sub-systems, and devices may include or be implemented by a processor executing software instructions stored in the computer-readable memories.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A cloud-based key injection system, comprising:
   at least one key injection sub-system including a key generation device and a quantum key distribution device connected with the key generation device; and
   a cloud-based encryption machine hosting sub-system including an encryption machine and a quantum key distribution device connected with the encryption machine, wherein:
   the encryption machine includes a virtual encryption device,
   the key injection sub-system and the encryption machine hosting sub-system are connected with each other through their respective quantum key distribution devices,
   the key generation device is configured to generate a root key component and to send the root key component via the quantum key distribution devices to the encryption machine, and
   the encryption machine is configured to receive root key components from one or more key generation devices and to generate a root key of the virtual encryption device in accordance with the received root key components.

2. The cloud-based key injection system of claim 1, wherein:
   the quantum key distribution devices are configured to negotiate a shared key pair between the key generation device and the encryption machine, and
   the quantum key distribution device of the at least one key injection sub-system is configured to use a negotiated shared key to perform encryption transmission of the root key component to the encryption machine.

3. The cloud-based key injection system of claim 1, wherein
   the at least one key injection sub-system includes one key injection sub-system; and
   the key generation device of the key injection sub-system is configured to generate a number of root key components for the virtual encryption device and to send the root key components via the quantum key distribution devices to the encryption machine.

4. The cloud-based key injection system of claim 1, wherein:
   the encryption machine is further configured to generate one root key component for the virtual encryption device and to generate the root key of the virtual encryption device in accordance with the received root key components from the at least one key injection sub-system and from the encryption machine.

5. The cloud-based key injection system of claim 4, wherein:
the at least one key injection sub-system comprises a cloud-based management sub-system and a user sub-system located at a client terminal;
the management sub-system comprises a quantum key distribution device and a management device including the key generation device; and
the user sub-system comprises a quantum key distribution device and a terminal device including the key generation device.

6. The cloud-based key injection system of claim 5, wherein the terminal device of the user sub-system is further configured to generate a user master key and to transmit the user master key to the encryption machine.

7. The cloud-based key injection system of claim 6, wherein the terminal device of the user sub-system is further configured to generate a user work key and to transmit the user work key to the encryption machine.

8. The cloud-based key injection system of claim 1, wherein the quantum key distribution device comprises a quantum encryption machine having a data encryption and decryption function.

9. The cloud-based key injection system of claim 1, wherein the encryption machine is configured to generate a root key of the virtual encryption device in accordance with the received root key components by using a secret reconstruction algorithm based on a threshold secret sharing mechanism.

10. A key injection method for an encryption machine comprising:
receiving, by the encryption machine, root key components from at least one key injection sub-system; and
generating, by the encryption machine, a root key in accordance with the received root key components from the at least one key injection sub-system, wherein:
the encryption machine is connected to a quantum key distribution device;
each of the at least one key injection sub-system includes a quantum key distribution device; and
receiving, by the encryption machine, the root key components from the at least one key injection sub-system comprises receiving, by the encryption machine, via the quantum key distribution devices, the root key components from the at least one key injection sub-system.

11. The key injection method of claim 10, wherein:
the encryption machine includes a virtual encryption device; and
the root key is for the virtual encryption device.

12. The key injection method of claim 10, wherein each root key component is generated by a key generation device of the at least one key injection sub-system.

13. The key injection method of claim 10, further comprising generating a root key component by the encryption machine, wherein generating, by the encryption machine, the root key in accordance with the received root key components from the at least one key injection sub-systems comprises:
generating, by the encryption machine, the root key in accordance with the received root key components from the at least one key injection sub-system and the root key component generated by the encryption machine.

14. The key injection method of claim 10, further comprising negotiating, by the encryption machine with each of the at least one key injection sub-system a shared key pair, and wherein the root key components from the at least one key injection sub-system are encrypted with a key in the shared key pair.

15. The key injection method of claim 10, wherein:
the at least one key injection sub-system comprises a cloud-based management sub-system and a user sub-system located at a client terminal, the cloud-based management sub-system including a key generation device, and the user sub-system including a key generation device.

16. The key injection method of claim 15, further comprising:
receiving a user master key generated by the user sub-system from the user sub-system.

17. The key injection method of claim 15, further comprising:
receiving a user work key generated by the user sub-system from the user sub-system.

18. The key injection method of claim 10, further comprising verifying identities of the at least one key injection sub-system.

19. The key injection method of claim 10, wherein generating, by the encryption machine, the root key in accordance with the received root key components from the at least one key injection sub-system comprises:
generating, by the encryption machine, a root key in accordance with the received root key components from the at least one key injection sub-system by using a secret reconstruction algorithm based on a threshold secret sharing mechanism.

20. A key injection apparatus for an encryption machine, comprising:
a memory storing a set of instructions; and
a processor configured to execute the set of instructions to cause the key injection apparatus for the encryption machine to perform:
negotiating a shared key pair with at least one key injection sub-system;
receiving root key components from the at least one key injection sub-system;
generating a root key component for a virtual encryption device on the encryption machine; and
generating a root key in accordance with the root key component for the virtual encryption device and the root key components received from the at least one key injection sub-system, wherein:
the encryption machine is connected to a quantum key distribution device;
each of the at least one key injection sub-system includes a quantum key distribution device; and
receiving the root key components from the at least one key injection sub-system comprises receiving, via the quantum key distribution devices, the root key components from the at least one key injection sub-system.

21. The key injection apparatus of claim 20, wherein:
the root key components received from the at least one key injection sub-system are encrypted with a key in the shared key pair.

22. The key injection apparatus of claim 20, wherein:
the at least one key injection sub-system includes a cloud-based management sub-system including a key generation device and a user sub-system including a key generation device located at a client terminal.

23. The key injection apparatus of claim 20, further comprising generating the root key by using a secret reconstruction algorithm based on a threshold secret sharing mechanism.

24. A non-transitory computer readable medium that stores a set of instructions that is executable by at least one processor of an encryption machine to cause the encryption machine to perform a key injection method comprising:
receiving root key components from at least one key injection sub-system; and
generating a root key in accordance with the received root key components from the at least one key injection sub-system, wherein:
the encryption machine is connected to a quantum key distribution device;
each of the at least one key injection sub-system includes a quantum key distribution device; and
receiving root key components, from the at least one key injection sub-system comprises receiving, via the quantum key distribution devices, the root key components from the at least one key injection sub-system.

25. The computer readable medium of claim 24, wherein:
the encryption machine includes a virtual encryption device; and
the root key is for the virtual encryption device.

26. The computer readable medium of claim 24, wherein each root key component is generated by a key generation device of the at least one key injection sub-system.

27. The computer readable medium of claim 24, wherein the key injection method further comprises generating a root key component by the encryption machine, wherein generating the root key in accordance with the received root key components from the at least one key injection sub-systems comprises:
generating the root key in accordance with the received root key components from the at least one key injection sub-system and the root key component generated by the encryption machine.

28. The computer readable medium of claim 24, wherein the key injection method further comprises:
negotiating with each of the at least one key injection sub-system a shared key pair, and
wherein the root key components from the at least one key injection sub-system are encrypted with a key in the shared key pair.

29. The computer readable medium of claim 24, wherein:
the at least one key injection sub-system comprises a cloud-based management sub-system and a user sub-system located at a client terminal, the cloud-based management sub-system including a key generation device, and the user sub-system including a key generation device.

30. The computer readable medium of claim 29, wherein the key injection method further comprises:
receiving a user master key generated by the user sub-system from the user sub-system.

31. The computer readable medium of claim 29, wherein the key injection method further comprises:
receiving a user work key generated by the user sub-system from the user sub-system.

32. The computer readable medium of claim 24, wherein the key injection method further comprises:
verifying identities of the at least one key injection sub-system.

33. The computer readable medium of claim 24, wherein generating the root key in accordance with the received root key components from the at least one key injection sub-system comprises:
generating the root key in accordance with the received root key components from the at least one key injection sub-system by using a secret reconstruction algorithm based on a threshold secret sharing mechanism.

* * * * *

UNITED STATES PATENT AND TRADEMARK OFFICE
CERTIFICATE OF CORRECTION

PATENT NO.         : 10,305,688 B2
APPLICATION NO.    : 15/134105
DATED              : May 28, 2019
INVENTOR(S)        : Yingfang Fu et al.

Page 1 of 1

It is certified that error appears in the above-identified patent and that said Letters Patent is hereby corrected as shown below:

On the Title Page

Item (30), "2015 1 0195062" should read as --201510195062.7--

Signed and Sealed this
Seventeenth Day of September, 2019

Andrei Iancu
*Director of the United States Patent and Trademark Office*